Figure 1:
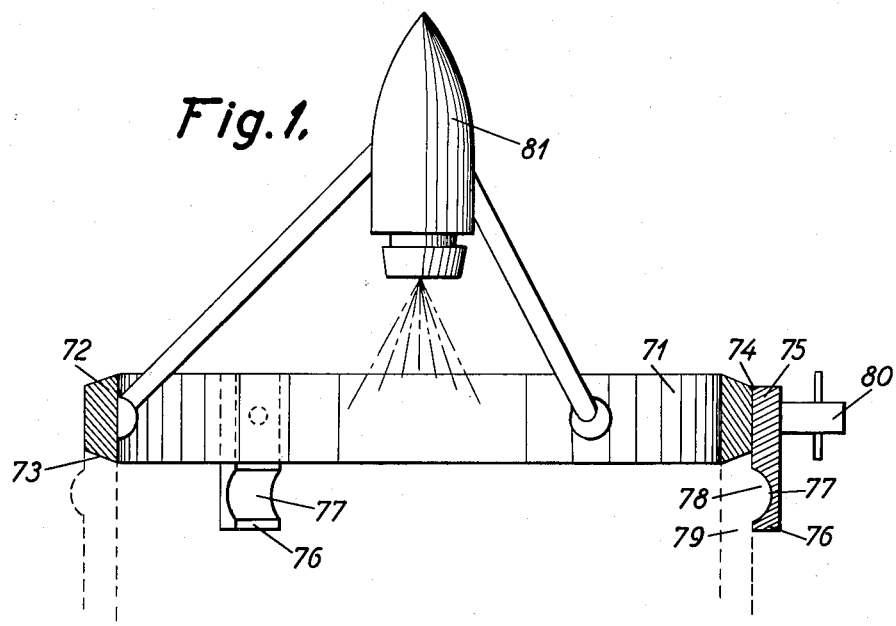

Nov. 8, 1955 K. SIGVARDT 2,723,160
SPRAYING MACHINES
Filed Feb. 27, 1953 2 Sheets-Sheet 1

KNUD SIGVARDT
Inventor
BY A. John Michel
ATTORNEY

Nov. 8, 1955 K. SIGVARDT 2,723,160
SPRAYING MACHINES
Filed Feb. 27, 1953 2 Sheets-Sheet 2

KNUD SIGVARDT
Inventor
BY
A. John Michel
ATTORNEY

United States Patent Office 2,723,160
Patented Nov. 8, 1955

2,723,160

SPRAYING MACHINES

Knud Sigvardt, Orehoved, Denmark, assignor to A/S R. Sigvardt, Orehoved, Denmark, a corporation of Denmark Application February 27, 1953, Serial No. 339,415

Claims priority, application Denmark March 3, 1952

4 Claims. (Cl. 299—73)

This invention relates to an improved spraying nozzle device for use in connection with spraying machines of the type provided with a single air blower pipe, or a plurality of independent air blower pipes, each provided with an atomizing nozzle device by means of which a spraying material, e. g. an insecticide, is ejected into the airstream issuing from the said blower pipe.

In hitherto known spraying machines provided with this type of blower pipes and atomizing nozzle devices the spraying material is ejected into the airstream in a direction which proceeds in the same or substantially in the same direction as the airstream issuing from the blower pipe. In such spraying machines, air and liquid are mixed together and produce a good distribution of chemical particles in the spraying liquid, and this mixture will be spread as a mist over a large area when the amount of air and the speed of airflow are sufficiently large. It has, however, been found that the distribution of chemical particles in the thus produced mist is not sufficiently dense to produce an effective treatment of the trees, and the reason of this is that the spraying liquid will not be sufficiently atomized unless a disproportionally powerful blower device is employed, but this is not practical. Since the spraying liquid in known spraying machines is ejected from the nozzle in the same direction as the air flows from the blower outlet, it will be carried along with the air and be distributed therein, but no appreciable atomizing of the spraying liquid takes place, and consequently the chemical particles will have substantially the same size as they had at the outlet of the nozzles.

An object of the invention is therefore to provide a spraying machine of the type in question by means of which it is possible to obtain a considerably improved atomizing effect than hitherto possible.

A further object of the invention is to provide a nozzle device which is so constructed that it can readily be changed from a position in which its outlet opening is turned in the same direction as that of the air flow from the blower pipe to an inverted position in which its outlet is turned counter the direction of flow of the said airstream.

A still further object of the invention is to provide a nozzle device of the described type which is provided with clamping means of simple design for attaching the device to the blower pipe outlet in any one of two relatively inverted positions.

Figure 2:
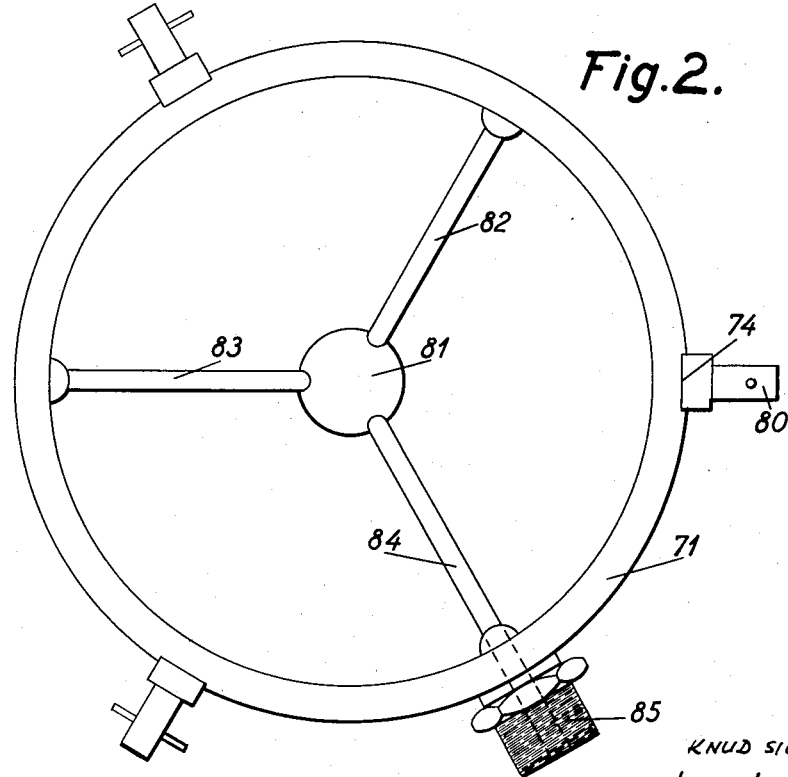
Figure 3:
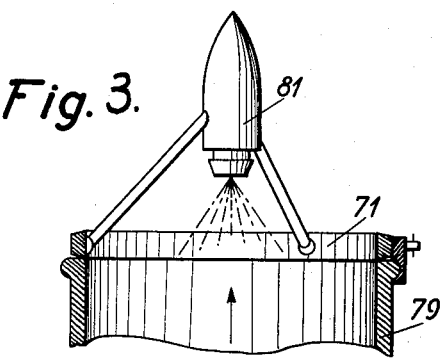
Figure 4:
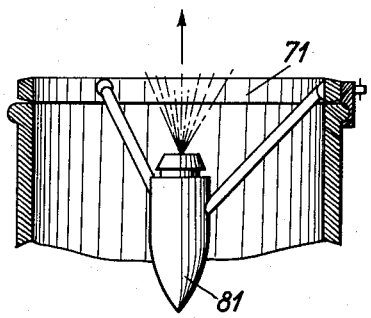
Figure 5:
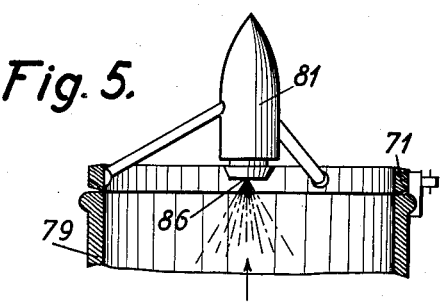
Figure 6:
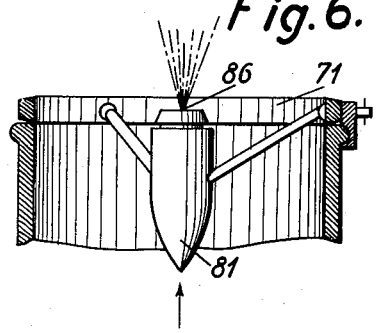
Figure 7:
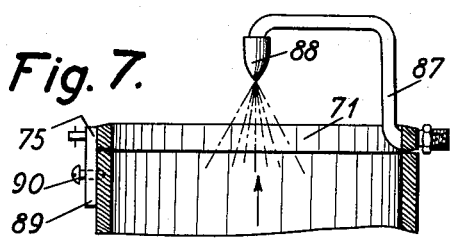
Figure 8:
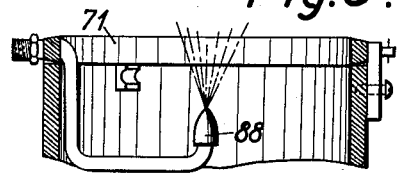

These and other objects of the invention will be apparent from the following description taken in conjunction with the accompanying drawing, in which Fig. 1 is a sectional view through the nozzle device, Fig. 2 is a plan view of the nozzle device shown in Fig. 1, Figs. 3 and 4 show on a smaller scale the nozzle device of Figs. 1 and 2 attached to a blower pipe outlet with its nozzle opening turned opposite the direction of air flow and turned in this direction respectively, Figs. 5 and 6 are corresponding illustrations of the arrangement shown in Figs. 3 and 4 with the nozzle opening positioned in a plane through the blower pipe outlet, and Figs. 7 and 8 are corresponding illustrations of the arrangement shown in Figs. 3 and 4 but with a modified construction of the nozzle device.

Referring to Figs. 1 and 2, the nozzle device comprises a flat ring 71 made of any suitable material, e. g. metal, and having similarly bevelled edges 72 and 73 adapted to fit the edge of a blower pipe outlet. In its exterior surface the ring 71 has a number e. g. three, relatively spaced recesses 74, each of which accommodates a detachable attachment member consisting of a plate member 75 for insertion in the recess 74, and having an extension 76 projecting somewhat beyond the one edge of the ring, which extension has a depression 77 in its surface destined to engage a bead 78 along the edge of the blower pipe 79, which in Fig. 1 is indicated with dotted lines. Through this blower pipe 79 air is blown in the direction indicated by the arrow in Fig. 1. The plate member 75 of the attachment member has a smooth hole for a clamping screw 80 which is screwed into a threaded hole in the ring 71.

To this ring is attached an atomizer nozzle 81 of conventional construction. The nozzle is attached to the ring by means of rods 82 and 83 and a tube 84, the rods and tube being attached to the ring and nozzle in such a manner that the nozzle is disposed a short distance outside the plane of the ring, with its nozzle opening disposed axially to the ring and in Figs. 1 and 3 is arranged opposite the direction of air flow from the blower pipe 79. The tube 84 is connected to a pipe connection 85 attached to the exterior of ring 71, and through a pipe (not shown) communicates with a pump by means of which a fluid is pumped to the nozzle 81 for ejection from the nozzle opening into the air flow from the blower pipe 79.

In the position of the nozzle 81 as shown in Fig. 3 the fluid issuing from the nozzle opening is injected into the air stream in a direction opposite that at which the air stream flows. Upon loosening the clamping screws 80 the attaching members 75, 76 are released so that the nozzle device 71, 81 may be removed from the blower outlet and then inverted and again attached to the blower pipe outlet with its nozzle in an inverted position. The loosened attachment members 75, 76 are likewise inverted and again clamped to the ring and the blower pipe bead 78 as shown in Fig. 4. The nozzle 81 is now inserted some distance within the blower pipe, and fluid from the nozzle is injected into the air stream in the direction of air flow.

The axially disposed nozzle 81 may, as shown in Figs. 5 and 6, be attached to ring 71 in such a position that its opening 86 is disposed in the plane of the ring. In this instance the nozzle opening will be disposed in the plane of the blower pipe outlet whether the nozzle is arranged for injection of fluid into the air stream against the direction of air flow, Fig. 5, or in the opposite direction, Fig. 6.

The nozzle device shown in Figs. 7 and 8 comprises a ring 71 having a pipe connection 85 which communicates with a pipe 87 attached by its one end to the interior of the ring. The other end of the pipe is provided with an atomizer nozzle 88 positioned axially to the blower pipe. The pipe 87 is bent in such a manner that all parts thereof lie within an area determined by the circumference of the blower pipe outlet, so that it is possible to invert the ring 71 from its position shown in Fig. 7 to that shown in Fig. 8. In Figs. 7 and 8 the attaching member 75 has an extension 89 through which is screwed a clamping screw 90. After tightening the clamping screw 80 by means of which the plate 75 is clamped to the ring 71, the clamping screw 90 is screwed into a depression in the exterior wall of the blower pipe which in this case has no bead.

The arrows in the various figures indicate the direction of air flow from the blower pipe 79.

The invention is not restricted to the manners of construction above described, or illustrated in the accompanying drawings, as it will readily be understood that they may be varied in many ways within the scope of the invention. Thus the ring may have any other appropriate shape than the circular shape shown, as likewise the attachment device may be adapted to the shape of a nozzle different from that shown. Instead of the clamping screw 80 may be used a screw carried through a ring wall from the interior side and provided with a nut applied to the screw and from the exterior side of the ring.

What I claim is:

1. A spraying nozzle device for attachment directly to the outlet end of a blower pipe, comprising an annular carrier member, an atomizing nozzle, support means for attaching said nozzle axially in relation to the annular carrier member, a tube having one end communicating with the interior of the atomizing nozzle and being affixed to the annular carrier, a spraying material supply conduit attached to the exterior of the annular carrier member and communicating with said tube, and invertible clamping members attached exteriorly to the annular carrier member for affixing this member detachably in any one of two relatively inverted positions on the outlet end of the blower pipe.

2. A spraying nozzle device for attachment directly to the outlet end of a blower pipe, comprising an annular carrier member, an atomizing nozzle, support means for attaching said nozzle axially in relation to the annular carrier member, said support means including a plurality of rods at least one of which is hollow and communicates with the interior of the atomizing nozzle, a spraying material supply conduit attached to the exterior of the annular carrier member and communicating with said hollow rod, and invertible clamping members attached exteriorly to the annular carrier member for affixing this member detachably in any one of two relatively inverted positions on the outlet end of the blower pipe.

3. A spraying nozzle device for attachment directly to the outlet end of a blower pipe, comprising an annular carrier member, an atomizing nozzle, a rigid supporting tube for attaching said nozzle axially in relation to the annular carrier member, a spraying material supply conduit attached to the exterior of the annular carrier member, the supporting tube communicating with the interior of the nozzle and with the spraying material supply conduit, and invertible clamping members attached exteriorly to the annular carrier member for affixing this member detachably in any one of two relatively inverted positions on the outlet end of the blower pipe.

4. A spraying nozzle device for attachment directly to the outlet end of a blower pipe, comprising an annular carrier member, an atomizing nozzle, support means for attaching said nozzle axially in relation to the annular carrier member, a tube having one end communicating with the interior of the atomizing nozzle, the other end being affixed to the annular carrier, a spraying material supply conduit attached to the exterior of the annular carrier member and communicating with said tube, a plurality of clamping members each comprising a clamp screw having a shoulder and being inserted in an exterior threaded hole in the annular carrier member, and a clamping arm so rotatably mounted on said screw between the annular carrier member surface and said screw shoulder that one end of the arm projects beyond the edge of the annular carrier member to engage the blower pipe end.

References Cited in the file of this patent

UNITED STATES PATENTS

| | | |
|---|---|---|
| 1,282,697 | Johnson | Oct. 22, 1918 |
| 2,356,950 | Root | Aug. 29, 1944 |
| 2,547,927 | Daugherty | Apr. 10, 1951 |